(12) United States Patent
Johnson et al.

(10) Patent No.: US 10,491,577 B2
(45) Date of Patent: Nov. 26, 2019

(54) SECURE, CUSTOMER-CONTROLLED STORAGE FOR CLOUD-MANAGED MEETING DETAILS

(71) Applicant: Blue Jeans Network, Inc., Mountain View, CA (US)

(72) Inventors: Nicklas R. Johnson, San Mateo, CA (US); Benjamin J. Hutchison, Santa Clara, CA (US)

(73) Assignee: Blue Jeans Network, Inc., San Jose, CA (US)

( * ) Notice: Subject to any disclaimer, the term of this patent is extended or adjusted under 35 U.S.C. 154(b) by 108 days.

(21) Appl. No.: 15/786,904

(22) Filed: Oct. 18, 2017

(65) Prior Publication Data

US 2019/0116167 A1 Apr. 18, 2019

(51) Int. Cl.
| H04L 29/06 | (2006.01) |
| G06Q 10/06 | (2012.01) |
| G06Q 10/10 | (2012.01) |
| H04L 9/08 | (2006.01) |

(52) U.S. Cl.
CPC ...... *H04L 63/065* (2013.01); *G06Q 10/06311* (2013.01); *G06Q 10/109* (2013.01); *H04L 9/0825* (2013.01); *H04L 9/0869* (2013.01); *H04L 9/0894* (2013.01); *H04L 63/0435* (2013.01); *H04L 63/0442* (2013.01); *H04L 63/06* (2013.01); *H04L 63/061* (2013.01); *H04L 63/0876* (2013.01)

(58) Field of Classification Search
CPC combination set(s) only.
See application file for complete search history.

(56) References Cited

U.S. PATENT DOCUMENTS

| 2016/0203444 | A1* | 7/2016 | Frank | G06Q 10/1095 705/7.19 |
| 2018/0075262 | A1* | 3/2018 | Auh | G06F 21/78 |
| 2018/0278605 | A1* | 9/2018 | Fitterer | H04L 63/0861 |
| 2018/0316653 | A1* | 11/2018 | Kanza | H04L 63/0861 |

FOREIGN PATENT DOCUMENTS

| EP | 2706491 A1 | 3/2014 |
| WO | 2017/075134 A1 | 5/2017 |

OTHER PUBLICATIONS

International Search Report and Written Opinion dated Dec. 21, 2018, from the ISA/EPO, for International Application No. PCT/US2018/055495 (filed Oct. 11, 2018), 13 pages.

* cited by examiner

*Primary Examiner* — Khoi V Le
(74) *Attorney, Agent, or Firm* — Ascenda Law Group, PC

(57) ABSTRACT

Embodiments are described for securing access to sensitive information used by on-premises devices in a distributed system. For example, embodiments include securing access to sensitive calendar items in a video conferencing service.

20 Claims, 6 Drawing Sheets

SECURE, CUSTOMER-CONTROLLED STORAGE FOR CLOUD-MANAGED MEETING DETAILS

FIELD OF THE INVENTION

The present invention is directed to approaches for allowing an organization using a distributed video conferencing system to control the privacy of adjunct calendar information.

BACKGROUND

Certain video conferencing services are distributed across geographies and the internet to enable greater access and an optimal experience for customers of the service. Customers may include organizations with many user accounts for the service. However, where a customer has a desire to maintain privacy of data used adjunct to the customer's video conferences, such as calendar data involved in scheduling a video conference on the service, there is a need for additional approaches to limit or avoid exposing this data outside of the customer's private network. The present application discloses embodiments that address aspects of this need.

SUMMARY

Embodiments are described for systems and methods for controlling the privacy of calendar items associated with a private enterprise, as used in a distributed service having a plurality of endpoints, wherein the calendar items are sourced from a third-party calendar service and decrypted at a calendar client that is a component of the distributed service. In a first step, by an on-premises listener, a first endpoint of the plurality is provisioned with a first-private key, a first-public key, and a common key-distribution secret associated with the private enterprise. The calendar client may cause a key-request-encryption key to be generated, and may provide a private-key request to a server of the distributed service, wherein the private-key request is signed by a putative key-distribution secret and the private-key request comprises the key-request-encryption key.

The on-premises listener may receive the private-key request, and responsive to the request, verify whether the putative key-distribution secret is the common key-distribution secret. If the key-distribution secret is verified to be correct, the listener may encrypt the respective first-private key using the key-request-encryption key, and provide the encrypted first-private key directly or indirectly to the calendar client.

The calendar client, upon receiving the encrypted respective first-private key may then decrypt the first-private key using the key-request-decryption key, request and receive a plurality of encrypted calendar items from the server of the distributed service, decrypt the calendar items using the first-private key, and display or otherwise use all or a subset of the decrypted calendar items.

DETAILED DESCRIPTION

Figure 1:
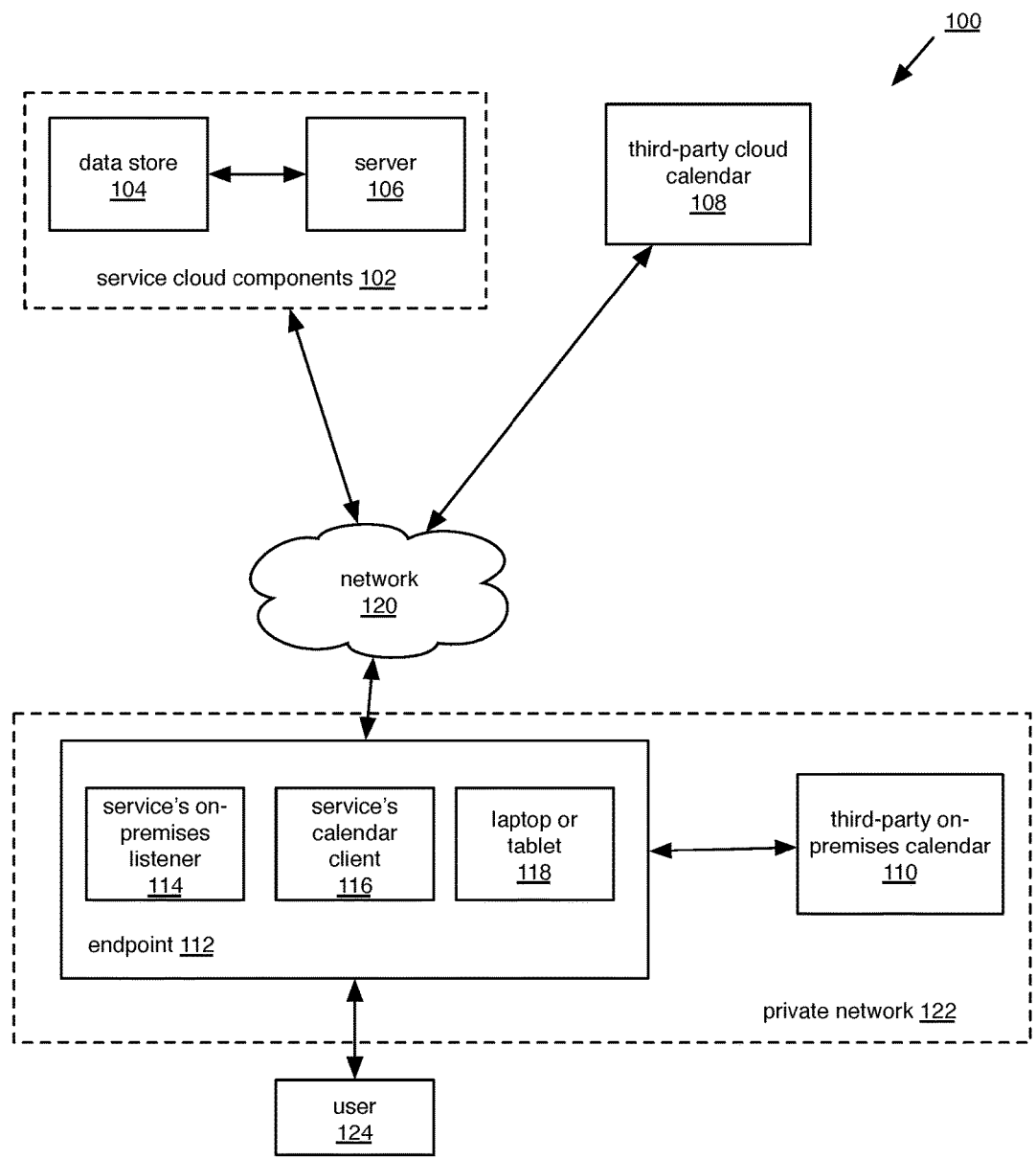
FIG. 1 depicts exemplary components of a video conferencing system in accordance with some embodiments of the invention.

Embodiments of apparatuses, computer systems, computer readable mediums, and methods for controlling the privacy of customer data as used in a video conferencing service are described. For example, a video conference service may be distributed and support numerous customers, each customer associated with a plurality of user accounts. Often, a customer, such as a company or enterprise or other type of organization, may have data security requirements or preferences regarding handling for the customer's proprietary or otherwise confidential data. The customer may be concerned about whether the customer's data could be exposed via the video conference service through an accident or a hack of the service's cloud components or remote data stores.

This concern can be addressed by only storing customer data in remote data stores of the service in an encrypted form. Where, for example, the encrypted data cannot be decrypted by the cloud components of a video conference service, there is a much lower risk of exposure for the customer's data—in particular, the risk of exposure due to a security breach at the video conferencing service is reduced. Decrypted customer data stored on-premises may be used by the customer and may be protected by what ever security protocol or firewall the customer decides is necessary and has implemented on the customer's private network.

Embodiments described here use a key-distribution secret—a secret provisioned at on-premises devices used in the video conference service, but that is not exposed to cloud components of the service—as part of an approach to authenticate requests for access to a first-private key for decrypting customer data. In certain embodiments, cloud components of the service never store unencrypted sensitive calendar items (i.e., the information that an organization wishes to keep private), and cannot decrypt these items. The customer, and not the administrator of the service, controls possession of the key-distribution secret and the first-private key. These items can only be decrypted on-premises by a device provisioned with the key-distribution secret and that consequently has access to the first-private key. Accordingly, lacking the key-distribution secret, the cloud components of the service cannot request the first-private key, cannot observe the key-distribution secret in transit, and cannot observe the first-private key in transit.

As used herein, the term "on-premises" is not a geographic distinction, but rather refers to a component being located on an enterprise network or private network (or network of networks) that is controlled by the customer; for example, on-premises components may be located behind a common firewall or otherwise accessible via a virtual private network (VPN).

Calendar information is one example of customer data that may include information the customer desires to maintain as private and readable only on-premises. For example, event titles and event descriptions may contain confidential trade secrets or otherwise proprietary information. In certain embodiments, a customer may desire that event categories, locations, dates, or times be maintained as private.

Calendar information (e.g., calendar items) may be used by an on-premises component of the video conferencing service, such as a calendar client, to display calendar event information on an on-premises device, to schedule access to a room used as a video conferencing endpoint based on calendar event dates, times, and/or location information, or to automatically join an endpoint to a video conference meeting (e.g., a session) at the time and location of a calendar event. In certain embodiments, the calendar information may be accessed or viewed through a secure web browser user interface by an administrator user—for example, the web browser interface may be secured through being accessible only via a virtual private network, or may be available only when provided with the first-private key for the endpoint.

FIG. 1 shows exemplary components of a video conferencing system 100 as well as third-party data sources. Video conferencing system 100 may be used for providing a video conferencing service—for example, involving media stream processing and distribution via network 120 to endpoints, such as endpoint 112. System 100 includes cloud components 102 that are remote from on-premises components, and on-premises components that may be, for example, located within a common private network 122. Data store 104 is a cloud component for storing information for use in providing video conferencing services to multiple customers; in certain embodiments, data store 104 is used to store calendar items. Server 106 is a cloud component, such as a server of a video conferencing service point of presence (POP). Server 106 may support a set of capabilities, such as audio, video, chat, screen sharing, related application programming interfaces (API) for accessing related data and function calls, and the like, for each user associated with a respective customer. Network 120 may be the internet, a Local Area Network (LAN), a telecommunications network, combinations of same, or the like. Third-party cloud calendar 108 is a cloud-based calendar providing calendaring services that are accessible over, for example, the internet, in which calendar items are stored remotely from the customer premises. An example of a third-party cloud calendar 108 is Google Calendar. Calendaring services support at least defining events associated with a date and time.

FIG. 1 also shows exemplary components associated with a private network 122. These on-premises components include an endpoint 112 and a third-party on-premises calendar 110. A third-party on-premises calendar may be configured to store event data locally within the private network 122. As an example, Microsoft Exchange calendars may be configured as a third-party on-premises calendar 110. Endpoints may comprise any type of device, including, but not limited to: laptops, computers, smartphones, touch-screen devices such as tablets (e.g., iPads, Android tablets), phones (e.g., smart phones), audio and video conferencing system devices, and/or any other device capable of sending and receiving data streams over a network. In certain embodiments, a single endpoint may be associated with multiple devices (e.g., as shown with example endpoint 112). Participants may use proprietary or standards-based communication protocols with their devices, and the video conference system may enable a multi-party and/or point-to-point (e.g., between two endpoints) video conference session among the plurality of participant endpoints.

As used herein, a traditional-hardware room system may serve as an endpoint and is a dedicated, standalone hardware device capable of initiating video conferencing calls using SIP or H.323 protocols without requiring the intervention of an external management system (e.g., the intervention of a cloud service). A traditional-hardware room system may receive control messages via a listener service (e.g., listener 114). A listener service may be deployed, as one or more instances, on site at an organization's facility. The listener service may connect to a cloud-based server of a service, such as a video conferencing service, to await commands to be executed at a traditional hardware video conferencing endpoint. A traditional-hardware room system is typically paired with an-on-premises instance of a listener service. The listener service instance runs on a server, and is configured to receive command instructions as an interface to the traditional-hardware room system. In certain embodiments, the listener service instance should be located in the same geographical area as the room system. The listener service may use Public/Private Key Encryption to secure passwords for access to the room system devices. Examples of traditional-hardware room systems include: a Cisco/Tandberg C20, C40, C60, EX60, EX90, SX10, SX20, IX5000, DX80, 6000 MXP; a Lifesize Icon 400 or Icon 600, Express 220, Room 220, Team 220; a Polycom RealPresence Group 300, 500, or 700, RealPresence Debut, HDX 6000 HD, 7000 HD, 8000 HD, 9000, VSX; a StarLeaf GT Mini 3330; and a Tely 200 or telyHD Pro.

As used herein, a cloud-managed room system may serve as an endpoint and is a room system that is controlled via a cloud-managed service, and uses the cloud-managed service to initiate calls. In certain embodiments, a cloud-managed room system includes an on-premises listener 114. This type of room system is provisioned via a cloud-hosted service. Examples of cloud-managed room systems include the Blue Jeans Huddle.

A room system endpoint may additionally include a video conferencing service calendar client 116, e.g., for display of calendar items concerning scheduled video conferences located at the room system endpoint, or display of calendar items associated with a user, department, or organization. A calendar client 116 is an application that uses calendar items. In certain embodiments, the calendar client has a user interface for presenting calendar items or depictions based on calendar items. In certain embodiments, such a calendar client 116 may run on a laptop or tablet 118 that is also associated with endpoint 112. User 124 may interact directly with components of endpoint 112—e.g., to participate in a video conference at the endpoint or to provision a device or service at the endpoint.

In certain embodiments, the term "calendar item" refers to calendar-related parameters, and calendar events or data associated with one or more fields from a collection of calendar events. Calendar items may include, for example, a calendar identifier, an associated uniform resource locator, a calendar owner, a calendar event, one or more attributes of a calendar event, and the like. Calendar event attributes may include, for example, a title or subject, a description, a location, a meeting identifier, a meeting password, a calendar identifier, a date, a time, attachments, one or more participants including an organizer and passive participants, and the like. In certain embodiments, an organization may wish that some or all of the data in these fields remain confidential or inaccessible outside of a private network—e.g., to require that the associated field data is encrypted when transmitted outside of a private network and in the absence of a virtual private network. In certain embodiments, the title, description, attachments, and participant list for each calendar event should be encrypted when stored (e.g., in data store 104) or transmitted outside of a private network (e.g., to server 106 of cloud components 102).

In certain embodiments, an exemplary room system, functioning as an endpoint 112, may comprise a personal computer, one or more displays, a camera, a microphone and speaker, and a tablet device. A personal computer may act as a hub for mediating data communications between some or all of the components of the room system endpoint, and may be, for example, a small form-factor computer such as a Mac Mini or an Intel NUC (Next Unit of Computing) computer. Displays may be a television, a monitor, or a projector and projector screen. The microphone and speaker may be contained in a single device or multiple devices; in certain embodiments, the room system may include multiple microphones and speakers. The tablet device (alternatively, another mobile device such as a smartphone or a laptop) may provide a user interface for controlling the video conferencing experience at room system and/or displaying calendar items via calendar client 116. In certain embodiments, such as a traditional room system, the room system may include a server, such as a server virtual machine or server hardware for running a listener service.

The customer controls possession of the key-distribution secret and the first-private key—that is, the customer controls the listener 114 device, any tablets associated with the endpoint, employee laptops, or local storage that may store the first-private key, and only the customer determines which users (e.g., users who are employees) may obtain and use the key-distribution secret.

Figure 2:
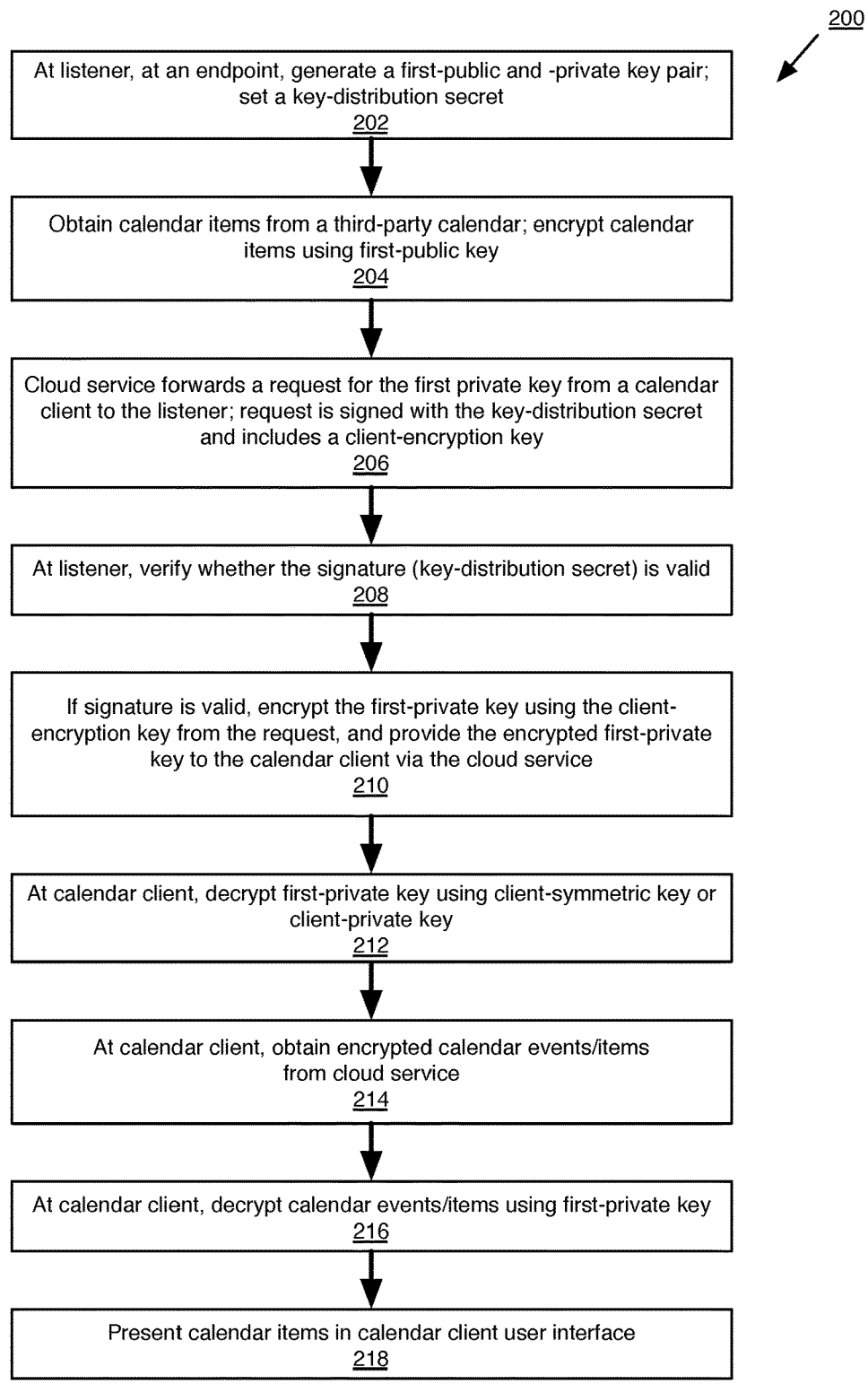
FIG. 2 shows a flow chart for an exemplary process concerning controlling the privacy of calendar items as used in a video conference service in accordance with some embodiments of the invention.

FIG. 2 shows a flow chart for an exemplary process 200 concerning controlling the privacy of calendar items as used in a video conference service. A user may initiate provisioning of an endpoint for using third-party-sourced calendar data with the video conferencing service, for example, during installation of a listener service at the endpoint. The user may cause an on-premises listener 114 to generate an asymmetric key pair—e.g., a first-public and first-private key pair—and set a common key-distribution secret (202). The first-public key may be provided to a cloud component of the video conference service, e.g., to a server 106. The first-public and first-private key pair may be used to, respectively, encrypt and decrypt calendar items from the third-party-sourced calendar data; note that data encrypted with one key may only be decrypted with the other key. As explained in more detail below, because the private key is never shared (in readable form) with the cloud components of the video conferencing service, the cloud components 102 cannot read or access the decrypted calendar data. In certain embodiments, the asymmetric key pair (i.e., public and private key pair) may be an RSA key pair, in which the keys are, for example, 2048- or 4096-bit keys. The first-private key is stored on-premises and in a manner accessible to the listener 114. Additionally, the key-distribution secret is used to authenticate, for example, customer-associated components or on-premises components that request access to the private key. In certain embodiments, the customer defines a single key-distribution secret for use at all endpoints controlled by a customer. In certain embodiments, a unique key-distribution secret is provisioned at each endpoint controlled by the customer. In certain embodiments, the endpoints controlled by a customer are grouped into subsets, and each subset is associated with a respective key-distribution secret. For example, subsets may be associated with a geographic region, a building, a customer department/division, or a customer subsidiary.

After provisioning the listener with the first-public and first-private keys, a component of the service (e.g., a server 106 or a listener 114) obtains calendar items from a third-party calendar, such as a cloud calendar 108 or an on-premises calendar 110 for use in connection with the video conferencing service (204). All or part of the calendar items may be encrypted using the first-public key and the encrypted calendar items are provided to the data store 104 for storage. The process for obtaining calendar items may depend on whether the third-party calendar is a cloud calendar or an on-premises calendar. In one example, the request for third-party calendar items includes a specification of the desired items associated with a particular calendar (e.g., all events for a particular calendar identifier in a data/time range), as well as credentials such as a key or username and password. An example of step 204 concerning an on-premises third-party calendar is described in connection with FIG. 3.

In certain embodiments, the calendar items obtained from the third-party calendar include all events associated with a calendar identifier, or, for example, the events associated with the calendar identifier that are associated with a certain date range for an event date (i.e., scheduled calendar date for the event), event creation date, or event edit date. The obtained calendar items may include all events limited by some combination of one or more of an associated: calendar identifier, event creation date, event date, calendar owner identifier, room identifier, and the like.

The obtained calendar items are encrypted prior to being stored in a cloud data store for use by the service (204). In one example (e.g., applicable to a cloud-based third-party calendar or an on-premises third-party calendar), a symmetric, two-way encryption key is generated using a random seed value (i.e., a data-store-symmetric key), and the data-store-symmetric key is used to encrypt the obtained calendar items at the cloud service (e.g., server 106) or the listener 114. The data-store-symmetric key itself may then be encrypted using the first-public key, and stored with the encrypted calendar items in data store 104. The first-private key is then needed to decrypt the data-store-symmetric key, so that the data-store-symmetric key can be used to decrypt the encrypted items. In another example, the first-public key is used to directly encrypt the obtained calendar items at the listener 114, such that the first-private key is required to decrypt those calendar items. In certain embodiments, the first-public key may be used to encrypt the obtained calendar items at the cloud service, without using a data-store-symmetric key as well. In certain embodiments, if the calendar items are above a certain size (e.g., they comprise data blocks larger than 256 bytes), items are stored encrypted using a symmetric key and with a public key encrypting the symmetric key (i.e., using both a symmetric key and the first public key), and if the items are below that size, the items are stored after encryption by the first public key.

In certain embodiments, all of the obtained calendar items are encrypted prior to storage in the cloud, e.g., in data store 104. In certain embodiments, only some or portions of the obtained calendar items are encrypted, e.g., as described below in connection with steps 308 and 310 of process 204. In one example, sensitive fields of calendar events such as the meeting's subject or title, and the meeting's description or message body may be encrypted, while other, non-sensitive information concerning the respective calendar event, such as the date (event date, event start time and/or event end time), the calendar identifier, or a meeting/event identifier (e.g., an identifier to identify the scheduled video conference in the service) may not be encrypted and may be stored in data store 104 in association with the encrypted sensitive fields. In certain embodiments, sensitive field values are extracted and encrypted. In other embodiments, non-sensitive fields are extracted and the remaining calendar item fields or entire calendar event object is encrypted and stored along with the unencrypted non-sensitive field values. In certain embodiments, calendar item metadata such as flags or a "private" label are encrypted; in other embodiments, the calendar item metadata is not encrypted.

All or some of the encrypted calendar items may then be sought and obtained by a calendar client 116 of the service, e.g., for decryption and display or other use. To ensure the security of the sensitive calendar items, requesting the first-private key for the purpose of decrypting the calendar items must be a secured operation such that the cloud components of the service cannot effect such a request, as they do not read or access the key-distribution secret. In certain embodiments, a device or client needing access to private data (e.g., the encrypted calendar items stored in the cloud) may authenticate a request for a decryption key (e.g., the first-private key) stored on a private network or in a secure location using a secret known to both the requestor and the requestee (e.g., the key-distribution secret, which is known to the calendar client and the listener). The key-distribution secret is not provided to the cloud service. For example, to obtain and/or use the calendar items, the calendar client must obtain the first-private key, and in order to obtain the first-private key, the request must be authentic and provide for a secure transmission of the key from the listener to the calendar client. Accordingly, in certain embodiments, the calendar client is provisioned with the same key-distribution secret used by the on-premises listener at the endpoint, and the listener supports an application programming interface (API) call for clients to request the private key, where the request must be signed using the key-distribution secret in order to authenticate the request.

For example, when the calendar client 116 is installed, an administrator user may set or enter the key-distribution secret also used by the on-premises listener. To enable secure transmission of the requested first-private key, the calendar client may generate a public and private key pair, for example based on a random seed (i.e., the key-request-public key and the key-request-public key). In certain embodiments, instead of a client-public/private key pair, a key-request-symmetric key (two-way key) based on a random seed is generated and used. Following one such approach, the calendar client 116 may send a private-key request for the first-private key to the cloud service (e.g., in order to decrypt calendar items encrypted with the first-public key). The private-key request may be signed using the key-distribution secret and may also include a key-request-encryption key (e.g., a key-request-public key or key-request-symmetric key) for encrypting the first-private key. The key-request-public key may be stored local to the calendar client, and in some embodiments may be stored in encrypted fashion—for example, it may be encrypted and decrypted using the key-distribution secret as a second symmetric key. In one example, to generate a signature for the private-key request, the key-distribution secret is used as a symmetric key to encrypt a key-request command, resulting in a private-key-request signature; the private-key-request signature, key-request command, and key-request-encryption key are provided to the listener via the private-key request (e.g., by way of the cloud service components). In certain embodiments, the private-key request additionally includes an identifier for the endpoint associated with the private key.

The key-distribution secret may be provisioned like a passphrase or password—it may be entered when provisioning a tablet or other client device used by the service, or using an administrator user interface. The length or complexity of the key-distribution secret may be set in accordance with an organization's security policies.

In response to receiving the private-key request, the cloud service (or server 106 of same) forwards the private-key request, or sends a second private-key request based on the request from the calendar client 116 to the listener 114 (206). At the listener, the private-key request signature (e.g., from the private-key request, based on a putative key-distribution secret) is validated (208). For example, to validate the signature, the listener, which was also provisioned with the key-distribution secret, may use the key-distribution secret to decrypt the private-key request signature. If the decrypted result matches the key-request command, the request is valid (i.e., authentic). If the decrypted result does not match, this indicates that the request was not signed with the correct key-distribution secret or was altered, and the private-key request will be treated as invalid. For example, if the private-key request fails authentication, in response, the listener may provide, to the service, an error message or error code (such as 403 unauthorized or 502 to indicate that the listener has refused to handle the request), or no result, and the first-private key will not be provided to the original requestor.

If the private-key request is found to be authentic, the listener encrypts the first-private key using the key-request-encryption key from the request, and provides the encrypted first-private key to the calendar client 116 by way of the cloud service (210). In certain embodiments, the private-key request and response may be directly communicated between the listener and the calendar client (e.g., without involving service cloud components 102), for example, where both listener and client are located on the same private network.

After receiving the encrypted first-private key, the calendar client decrypts it using a key-request-decryption key (e.g., the key-request-public key or key-request-symmetric key) (212). In certain embodiments, rather than performing steps 206, 208, 210, and 212, the first-private key is manually provided to the calendar client 116—for example, it may be set by an administrator user during installation of the calendar client. After the calendar client receives the first-private key, it may be stored in local storage for future use. Additionally, before or after obtaining the first-private key, the calendar client obtains encrypted calendar events or other calendar items from the cloud service (214). A calendar client 116 may identify desired calendar items, for example, using a combination of one or more of calendar identifier, event creation date, scheduled event date, calendar owner identifier, room identifier, and the like. In certain embodiments, the calendar client may update calendar items saved locally if there are newer or updated versions saved in the cloud data store 104. After obtaining the first-private key, the calendar client uses the first-private key to decrypt the encrypted calendar events or items (216). Note that in the case where the encrypted calendar items are encrypted using a data-store-symmetric key that itself is encrypted using the first-public key, the calendar client will receive the encrypted data-store-symmetric key in addition to the encrypted calendar events/items, and first the first-private key will be used to decrypt the data-store-symmetric key, and next the data-store-symmetric key will be used to decrypt the calendar events/items. In the case where the calendar events/items are encrypted using the first-public key, the first-private key will be used to directly decrypt the calendar events/items.

After decrypting the calendar items, the calendar client may use the calendar items. For example, the calendar client may present all or a subset of the items in a client user interface on, for example, a tablet device located at the endpoint (218).

In certain embodiments, when a listener receives encrypted calendar items (from, e.g., a cloud component 102) that is in the process of being pushed to a device associated with the listener's endpoint (e.g., a tablet device 118), the listener will decrypt the calendar items using the first-private key (and potentially a data-store-symmetric key associated with a respective calendar item) before pushing the calendar items to the device.

Figure 3:
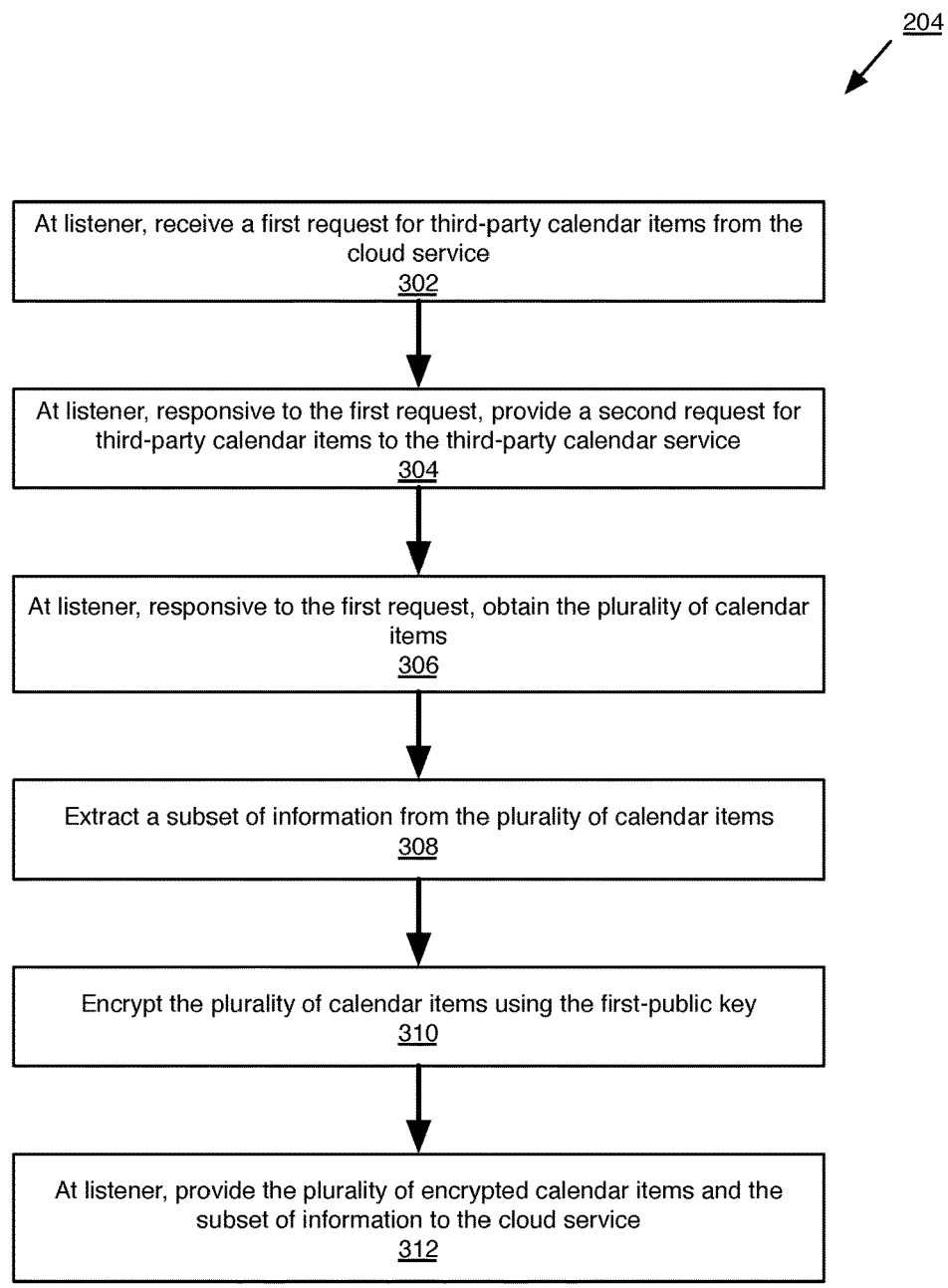
FIG. 3 shows a flow chart for an exemplary process concerning encrypting calendar items from a third-party on-premises calendar service for use in a video conference service in accordance with some embodiments of the invention.

FIG. 3 shows a flow chart for an embodiment of process 204 concerning obtaining and encrypting calendar items from a third-party calendar, e.g., for subsequent use in connection with a video conferencing service. In the embodiment shown in FIG. 3, the third-party calendar is an on-premises calendar 110. First, a listener 114 receives a first request for third-party calendar items from a cloud service (e.g., from a server 106) (302). In certain embodiments, the request specifies the desired calendar items using, for example, a calendar identifier, a date range, and/or a uniform resource locator. Responsive to that first request, the listener forwards the first request or provides a corresponding second request for the third-party calendar items to the third-party calendar service 110 (304).

Responsive to the first request or corresponding second request, the listener receives the requested calendar items (306). Certain information is extracted from the received calendar items. The extracted subset of information may represent, for example, sensitive field values, or non-sensitive field values (308). If sensitive field values are extracted, these values are then encrypted using the first-public key (i.e., the first-public key that was initially provisioned at the listener in step 202). If non-sensitive field values are extracted, the received calendar items are then encrypted using the first-public key (310). In certain embodiments, the listener generates a data-store-symmetric key to directly encrypt the sensitive field values or calendar items, the symmetric key is encrypted using the first-public key, and the encrypted symmetric key is then associated with the encrypted field values or items in storage. The encrypted items are then provided to the cloud service for storage, e.g., in data store 104 (312). In this approach, the calendar items are encrypted prior to sending the calendar items to the service's cloud components 102, so these items are never received in the cloud in an unencrypted form. In certain embodiments, all or a portion of the unencrypted calendar items (i.e., non-sensitive information) is additionally provided to the cloud service along with the encrypted calendar items.

In certain embodiments, e.g., where calendar items are sourced from a third-party calendar, meeting details may be read by a cloud component only transiently during calendar item downloading. Unencrypted meeting details or other sensitive information should never be stored in cloud storage, such as data store 104.

In certain embodiments, the service may update the stored calendar items based on calendar items retrieved from the third-party calendar to a first-retrieval component of the system (e.g., the listener, as in step 306 of process 204, or the cloud service). Prior to encrypting the calendar items at the first-retrieval component, a one-way hash is used to efficiently determine if the details of a given event has changed while avoiding storing the decrypted details at, e.g., a cloud component 102, and because in the case where a random-seed symmetric encryption key has been used to encrypt the calendar item, a comparison of the encrypted content to a prior version of the same event will be different regardless of whether the content has changed because the symmetric encryption keys will be different. For example, the event, or one or more attributes or field values of the event (e.g., the subject/title and description/message body) are provided to a hash function as a parameter to obtain a hash result for the parameter. The hash result associated with the event may be stored at the first-retrieval component for comparison with later calendar item updates. Upon receiving a later download of calendar items, the hash result for the current event may be compared with the hash result for the previous version of the event; if the hash result has changed, this indicates that the value of the parameter has changed, and accordingly the corresponding encrypted event stored at the data store 104 should be updated.

Figure 4:
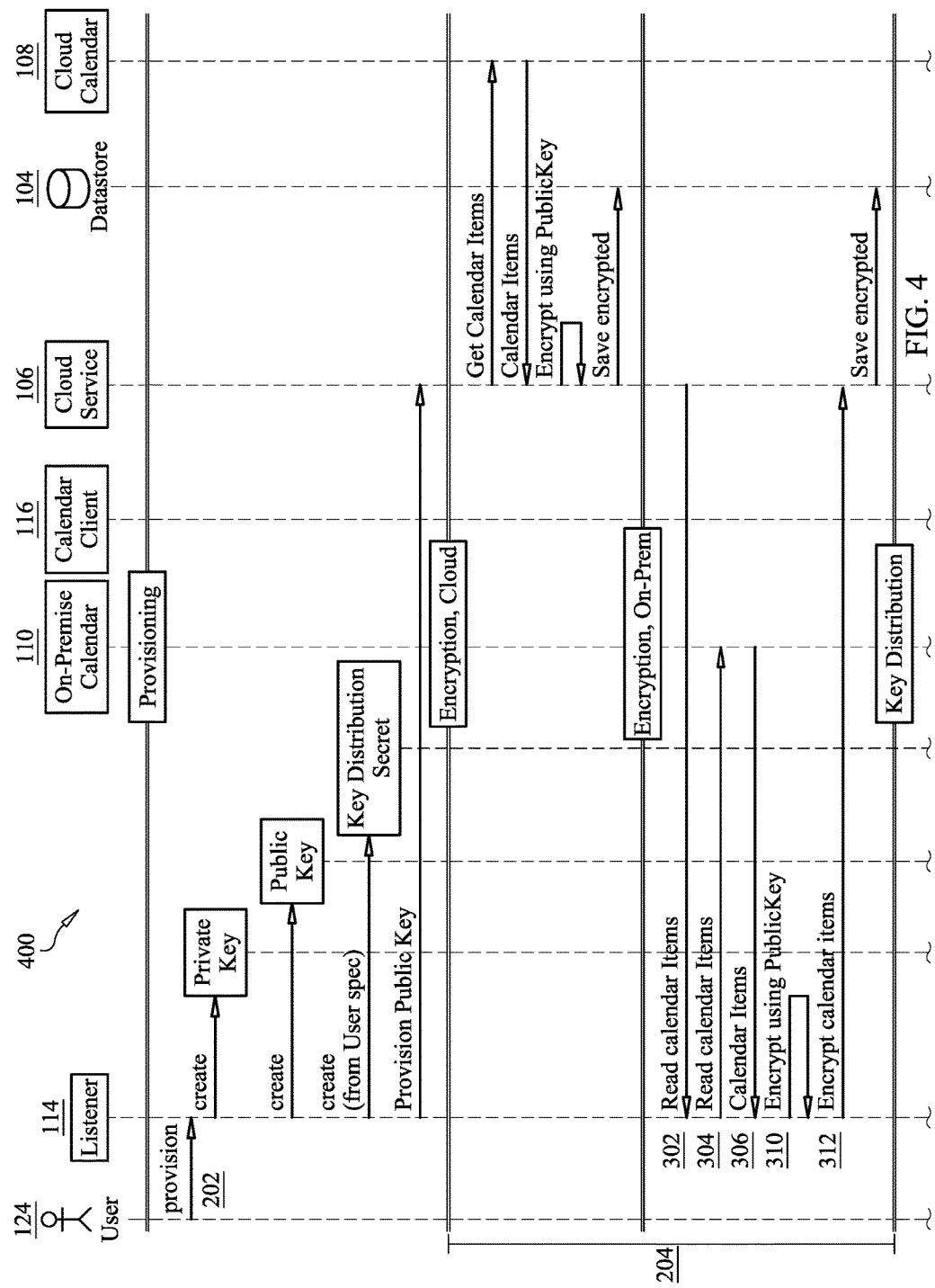
FIG. 4 shows a sequence diagram for an exemplary set of communications with a video conferencing system in accordance with some embodiments of the invention.
Figure 4:
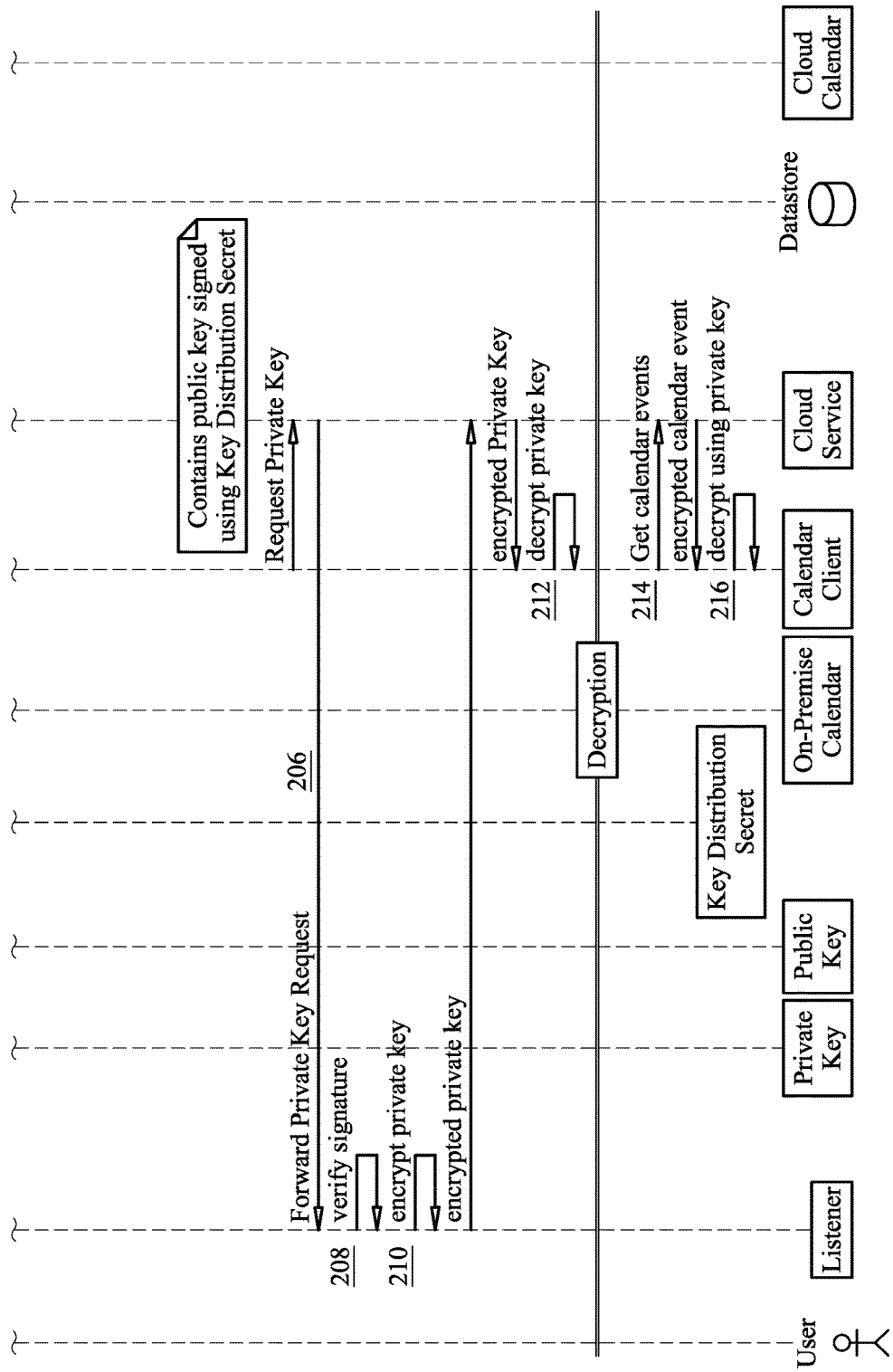

FIG. 4 shows a sequence diagram for an exemplary set of communications 400 with a video conferencing service. The sequence of communications illustrates one example of using steps of processes 200 and 204 to provision and then populate a calendar client 116 with calendar events sourced from a third-party calendar. The illustrated communications are between a user 124, a listener service 114, an on-premises third-party calendar 110, a calendar client 116, a remote server 106 of a video conferencing service, a remote data store 104, and a third-party cloud calendar 108.

Figure 5:
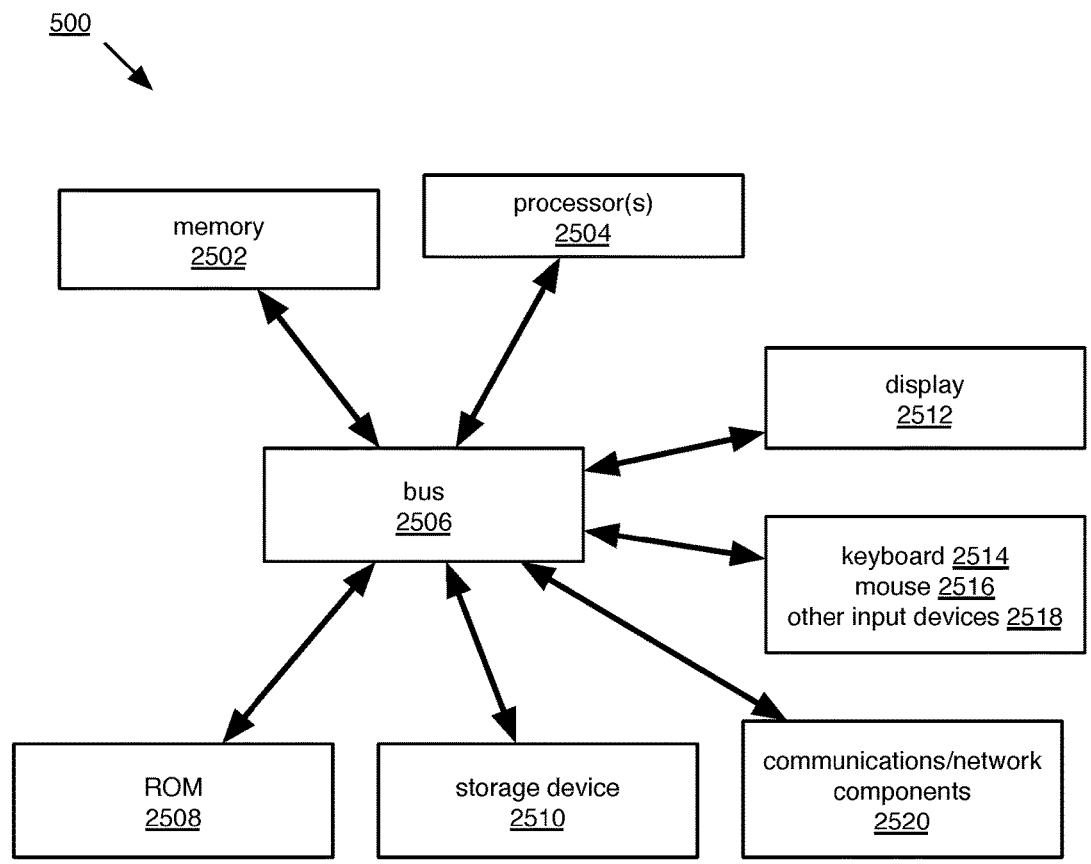
FIG. 5 shows a block diagram of an exemplary computing system in accordance with some embodiments of the invention.

FIG. 5 is a block diagram showing an exemplary computing system 500 that is representative any of the computer systems or electronic devices discussed herein. Note that not all of the various computer systems have all of the features of system 500. For example, systems may not include a display inasmuch as the display function may be provided by a client computer communicatively coupled to the computer system or a display function may be unnecessary.

System 500 includes a bus 2506 or other communication mechanism for communicating information, and a processor 2504 coupled with the bus 2506 for processing information. Computer system 500 also includes a main memory 2502, such as a random access memory or other dynamic storage device, coupled to the bus 2506 for storing information and instructions to be executed by processor 2504. Main memory 2502 also may be used for storing temporary variables or other intermediate information during execution of instructions to be executed by processor 2504.

System 500 includes a read only memory 2508 or other static storage device coupled to the bus 2506 for storing static information and instructions for the processor 2504. A storage device 2510, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 2504 can read, is provided and coupled to the bus 2506 for storing information and instructions (e.g., operating systems, applications programs and the like).

Computer system 500 may be coupled via the bus 2506 to a display 2512 for displaying information to a computer user. An input device such as keyboard 2514, mouse 2516, or other input devices 2518 may be coupled to the bus 2506 for communicating information and command selections to the processor 2504. Communications/network components

2520 may include a network adapter (e.g., Ethernet card), cellular radio, Bluetooth radio, NFC radio, GPS receiver, and antennas used by each for communicating data over various networks, such as a telecommunications network or LAN.

The processes referred to herein may be implemented by processor 2504 executing appropriate sequences of computer-readable instructions contained in main memory 2502. Such instructions may be read into main memory 2502 from another computer-readable medium, such as storage device 2510, and execution of the sequences of instructions contained in the main memory 2502 causes the processor 2504 to perform the associated actions. In alternative embodiments, hard-wired circuitry or firmware-controlled processing units (e.g., field programmable gate arrays) may be used in place of or in combination with processor 2504 and its associated computer software instructions to implement the invention. The computer-readable instructions may be rendered in any computer language including, without limitation, Python, Objective C, C#, C/C++, Java, Javascript, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 500 or similar electronic computing device, that manipulates and transforms data represented as physical (electronic) quantities within its registers and memories into other data similarly represented as physical quantities within its memories or registers or other such information storage, transmission or display devices.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A method for controlling the privacy of calendar items associated with a private enterprise as used in a distributed service having a plurality of endpoints, wherein the calendar items are sourced from a third-party calendar service and decrypted at a calendar client associated with the distributed service, the method comprising:
   by an on-premises listener at a first device of the plurality of devices, generating a first-public key and a first-private key as an asymmetric key pair, provisioning the first device of the plurality of devices with the first-private key, the first-public key and a key-distribution secret associated with the private enterprise, and storing the first-private key so as to be accessible only to the on-premises listener;
   by the calendar client:
      providing a private-key request to a server of the distributed service, wherein the private-key request is signed by a putative-key-distribution secret and comprises a key-request-encryption key;
   by the on-premises listener:
      receiving the private-key request;
      responsive to the private-key request, verifying whether the putative-key-distribution secret is the key-distribution secret; and
      encrypting the first-private key using the key-request-encryption key, and providing the encrypted first-private key when verification is satisfied;
      providing an error code when verification is not satisfied; by the calendar client:
      receiving the encrypted first-private key;
      decrypting the encrypted first-private key using a key-request-decryption key;
      receiving a plurality of encrypted calendar items from the server of the distributed service;
      decrypting the plurality of encrypted calendar items using the first-private key;
      populating the calendar client with one or more of the plurality of calendar items.

2. The method of claim 1, wherein the third-party calendar service is a third-party on-premises calendar, and further comprising, by the on-premises listener:
   receiving a first request for third-party calendar items from the server of the distributed service;
   providing a second request for the plurality of calendar items to the third-party calendar service;
   responsive to the second request, receiving the plurality of calendar items;
   extracting a subset of information from the plurality of calendar items, wherein the subset does not include the calendar item titles or calendar item descriptions;
   encrypting the plurality of calendar items using the first-public key; and
   responsive to the first request, providing the encrypted plurality of calendar items and the subset of information to the server of the distributed service.

3. The method of claim 2, wherein prior to encrypting the plurality of calendar items using the first-public key, for each calendar item of the plurality, a hash of the respective calendar item saved at the on-premises listener is used to determine whether the respective calendar item has changed relative to a prior version of the respective calendar item, and when the respective calendar item has changed, the prior version of the respective calendar item is replaced with the respective calendar item.

4. The method of claim 2, wherein the subset of information does not include any sensitive information.

5. The method of claim 1, further comprising:
   by the on-premises listener, providing the first-public key to the server of the distributed service.

6. The method of claim 1, wherein the key-request-encryption key is a key-request-symmetric key and the key-request-decryption key is the key-request-symmetric key.

7. The method of claim 1, wherein the first device is associated with one of a plurality of subsets of devices, each subset of devices associated with the private enterprise, and the key-distribution secret is common to each device within the one of the plurality of subsets of devices.

8. The method of claim 1, wherein decrypting the plurality of encrypted calendar items using the first-private key comprises decrypting a data-store-symmetric key, and using the data-store-symmetric key to decrypt one or more of the encrypted calendar items.

9. The method of claim 2, wherein encrypting the plurality of calendar items using the first-private key comprises encrypting one or more of the plurality of calendar items with a data-store-symmetric key, and encrypting the data-store-symmetric key with the first-private key.

10. The method of claim 1, wherein displaying populating the calendar client with one or more of the plurality of calendar items comprises displaying a list of meetings on a touchscreen device located at the first device.

11. A video conferencing system having a plurality of devices, comprising:
   an on-premises listener at a first device having a first processor and a first storage device communicatively coupled to the first processor;
   a calendar client at a second device having a second processor and a second storage device communicatively coupled to the second processor;
   a set of instructions on the first and second storage devices that, when executed by the first and second processors, cause the first and second processors to:
      by the on-premises listener, generating a first-public key and a first-private key as an asymmetric key pair, provision the first device with the first-private key, the first-public key and a key-distribution secret associated with a private enterprise, and store the first-private key so as to be accessible only to the on-premises listener;
      by the calendar client:
      provide a private-key request to a server of the video conferencing system, wherein the private-key request is signed by a putative-key-distribution secret and comprises the key-request-encryption key; by the on-premises listener:
      receive the private-key request;
      responsive to the private-key request, verify whether the putative-key-distribution secret is the key-distribution secret; and
      encrypt the first-private key using the key request-encryption key, and provide the encrypted first-private key when verification is satisfied;
      provide an error code when verification is not satisfied;
      by the calendar client:
      receive the encrypted first-private key;
      decrypt the encrypted first-private key using a key-request-decryption key;
      receive a plurality of encrypted calendar items from the server of the video conferencing system;
      decrypt the plurality of encrypted calendar items using the first-private key;
      populate the calendar client with one or more of the plurality of calendar items.

12. The video conferencing system of claim 11, the set of instructions further comprising, by the on-premises listener:
   receive a first request for third-party calendar items from the server of the video conferencing system;
   provide a second request for the plurality of calendar items to an on-premises third-party calendar service;
   responsive to the second request, receive the plurality of calendar items;
   extract a subset of information from the plurality of calendar items, wherein the subset does not include the calendar item titles or calendar item descriptions;
   encrypt the plurality of calendar items using the first-public key; and
   responsive to the first request, providing the encrypted plurality of calendar items and the subset of information to the server of the video conferencing system.

13. The video conferencing system of claim 12, wherein prior to encrypting the plurality of calendar items using the first-public key, for each calendar item of the plurality, a hash of the respective calendar item saved at the on-premises listener is used to determine whether the respective calendar item has changed relative to a prior version of the respective calendar item, and when the respective calendar item has changed, the prior version of the respective calendar item is replaced with the respective calendar item.

14. The video conferencing system of claim 12, wherein the subset of information does not include any sensitive information.

15. The video conferencing system of claim 11, the instructions further comprising:
   by the on-premises listener, provide the first-public key to the server of the video conferencing system.

16. The video conferencing system of claim 11, wherein the key-request-encryption key is a key-request-symmetric key and the key-request-decryption key is the key-request-symmetric key.

17. The video conferencing system of claim 11, wherein the first device is associated with one of a plurality of subsets of devices, each subset of devices associated with the private enterprise, and the key-distribution secret is common to each device within the one of the plurality of subsets of devices.

18. The video conferencing system of claim 11, wherein decrypting the plurality of encrypted calendar items using the first-private key comprises decrypting a data-store-symmetric key, and using the data-store-symmetric key to decrypt one or more of the encrypted calendar items.

19. The video conferencing system of claim 12, wherein encrypting the plurality of calendar items using the first-private key comprises encrypting one or more of the plurality of calendar items with a data-store-symmetric key, and encrypting the data-store-symmetric key with the first-private key.

20. The video conferencing system of claim 11, wherein populating the calendar client with one or more of the plurality of calendar items comprises displaying a list of meetings on a touchscreen device located at the first device.

* * * * *